(12) United States Patent
Kalsnes et al.

(10) Patent No.: US 7,438,153 B2
(45) Date of Patent: Oct. 21, 2008

(54) ALL-TERRAIN VEHICLE ENGINE CONFIGURATION

(75) Inventors: Kenneth Kalsnes, Thief River Falls, MN (US); Robert Rauch, Thief River Falls, MN (US)

(73) Assignee: Artic Cat Inc., Thief River Falls, MN (US)

(*) Notice: Subject to any disclaimer, the term of this patent is extended or adjusted under 35 U.S.C. 154(b) by 199 days.

(21) Appl. No.: 11/129,069

(22) Filed: May 12, 2005

(65) Prior Publication Data

US 2006/0254849 A1 Nov. 16, 2006

(51) Int. Cl.
*B60K 13/06* (2006.01)
(52) U.S. Cl. .................. 180/292; 180/908; 180/296
(58) Field of Classification Search .......... 180/292, 180/291, 296, 297, 908
See application file for complete search history.

(56) References Cited

U.S. PATENT DOCUMENTS

| | | | | |
|---|---|---|---|---|
| 4,666,015 A | * | 5/1987 | Matsuda et al. | 180/233 |
| 4,697,665 A | * | 10/1987 | Eastman et al. | 180/230 |
| 4,722,235 A | * | 2/1988 | Kumazawa | 74/15.66 |
| 6,142,123 A | | 11/2000 | Galasso et al. | |
| 6,170,597 B1 | * | 1/2001 | Fukuda | 180/292 |
| 6,182,784 B1 | * | 2/2001 | Pestotnik | 180/376 |
| 6,343,669 B2 | | 2/2002 | Davis et al. | |
| 6,454,040 B1 | * | 9/2002 | Fukuda | 180/374 |
| 6,523,627 B2 | * | 2/2003 | Fukuda | 180/68.4 |
| 6,622,806 B1 | * | 9/2003 | Matsuura | 180/68.1 |
| 6,626,260 B2 | * | 9/2003 | Gagnon et al. | 180/291 |
| 6,632,144 B1 | * | 10/2003 | Narita et al. | 464/179 |
| 6,712,172 B2 | * | 3/2004 | Inagaki et al. | 180/292 |
| 6,868,932 B1 | | 3/2005 | Davis et al. | |
| 6,877,573 B2 | | 4/2005 | Hasegawa | |
| 6,964,310 B2 | | 11/2005 | Hasegawa | |
| 2001/0027890 A1 | | 10/2001 | Bria et al. | |
| 2002/0033295 A1 | * | 3/2002 | Korenjak et al. | 180/292 |
| 2003/0217884 A1 | * | 11/2003 | Kawamoto | 180/292 |
| 2004/0216942 A1 | * | 11/2004 | Tanaka et al. | 180/292 |
| 2005/0103553 A1 | * | 5/2005 | Korenjak et al. | 180/292 |
| 2006/0231322 A1 | * | 10/2006 | Morin et al. | 180/337 |
| 2006/0270503 A1 | * | 11/2006 | Suzuki et al. | 474/144 |
| 2007/0054765 A1 | * | 3/2007 | Mochizuki et al. | 474/18 |

* cited by examiner

*Primary Examiner*—Jeffrey J Restifo
(74) *Attorney, Agent, or Firm*—Black Lowe & Graham PLLC

(57) ABSTRACT

An off-road vehicle for traveling over land includes a frame, an engine, a transmission, and a seating arrangement. The frame has a forward end and a rearward end. The vehicle includes a longitudinal axis extending from the forward end to the rearward end. A single or tandem seating arrangement is arranged along the longitudinal axis in certain embodiments. The engine is secured to the frame. The engine includes at least one cylinder and a crankshaft with a crankcase fastened generally beneath the cylinder. A transmission is coupled to the engine crankshaft. The transmission extends forwardly from the crankshaft toward the forward end of the frame along the longitudinal axis. A side-by-side seating arrangement is secured to the frame generally along an axis substantially perpendicular to the longitudinal axis of the vehicle. An air intake is provided at the forward side of the cylinder with an exhaust out the rearward side.

7 Claims, 4 Drawing Sheets

US 7,438,153 B2

ALL-TERRAIN VEHICLE ENGINE CONFIGURATION

FIELD OF THE INVENTION

This invention relates generally to engine arrangements for off-road vehicles, such as all-terrain vehicles (ATVs) and multi-purpose off-road (off-highway) utility vehicles and, more specifically, to an engine with a forward-extending transmission and reversed exhaust, air intake, and shaft outputs.

BACKGROUND OF THE INVENTION

Standard all-terrain-vehicle and multi-purpose off-road utility vehicle engines are mounted to a frame at a position intermediate the front and rear wheels. The arrangement includes a forward-positioned cylinder or cylinders with a crankcase below the cylinder. The transmission extends rearward from the crankcase. In the case of a continuously variable transmission, a drive pulley is coupled to the engine crank shaft. A belt extends rearward from the drive pulley to a driven pulley. The driven pulley is then coupled to the driveshaft or shafts through various gears. The driveshaft, or driveshafts with a four-wheel-drive vehicle, extends to a drive or differential to propel the wheels.

This conventional arrangement generally works well, especially with a straddle mounted vehicle. However, drawbacks include a hot exhaust pipe, noise, and high engine running temperatures. The hot exhaust pipe exits the cylinder from a front side thereof and may pass by the leg of the user. Space problems also occur with side-by-side seating arrangements as the larger part of the engine is in the area needed for the users' legs.

Therefore, a different engine arrangement may be desirable for an ATV, especially one with a side-by-side seating arrangement and a continuously variable transmission. Certain drawbacks of the prior systems are overcome and various other advantages are achieved with the arrangement set forth herein.

SUMMARY OF THE INVENTION

The present invention provides an engine and transmission arrangement for an off-road vehicle such as a multi-purpose vehicle or ATV that allows extra room for the driver and passenger and adds to vehicle rider comfort by reducing noise and heat levels.

An ATV is provided that includes a frame, an engine, a transmission, and a driveshaft. The frame has a forward end and a rearward end. The engine is secured to the frame. The engine includes a cylinder and a crankcase generally below the cylinder. The transmission extends forward from the crankcase. The driveshaft is coupled to the transmission and to the drive or differential for driving the vehicle wheels.

In the preferred embodiment, the transmission includes a belt drive. A continuously variable transmission extends from a drive pulley rotatably coupled to the engine. The belt extends forwardly to a driven pulley coupled to the driveshaft.

In a further preferred aspect of the invention, the cylinder includes a forward side and rearward side with an air intake in fluid communication with the forward side. An exhaust port extends from the rearward side of the cylinder. An exhaust pipe is in fluid communication with and extends rearward from the exhaust port. Thus, the hot gases and hot exhaust pipe are kept from the driver and passenger of the vehicle. Other mechanical engine noises are located more to the rear of the vehicle such that operator noise levels are reduced.

In a further aspect of the invention, a rearward driveshaft is provided extending toward the rearward end of the frame for driving the rear wheels. A forward drive shaft is provided, extending toward the forward end of the vehicle for driving the front wheels. Thus, an ATV or multi-purpose utility vehicle is provided with a transmission that extends forward of the crankcase.

A still further aspect of the invention includes a plurality of seating locations positioned side-by-side, generally parallel to the transverse axis of the vehicle. The transverse axis is generally normal to a longitudinal axis of the vehicle that runs from the forward end to the rearward end. The seating arrangement or seating locations are provided in a preferred embodiment by seats or a bench secured to the frame. In this arrangement, the vehicle provides user foot space generally forward of the engine and transmission.

Besides gaining seat and leg room, intake and exhaust part mounting is simplified. The rear exiting exhaust provides a shorter hot pipe with lower potential for exposure to the user during vehicle operation. The forward-positioned intake also feeds cooler air to the engine.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENTS

Figure 1:
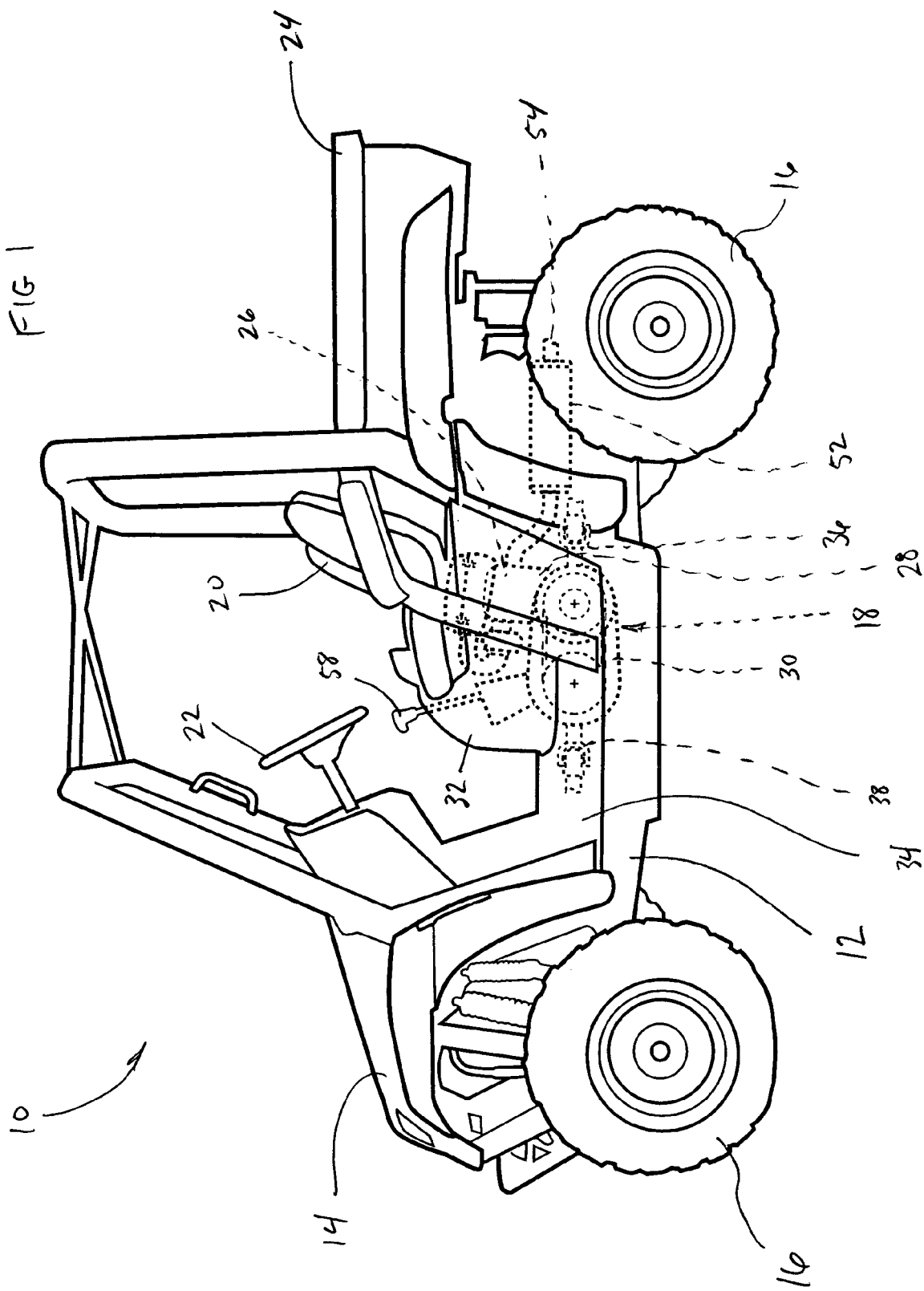
FIG. 1 is a side-elevational view of a vehicle according to the present invention showing selected engine components in phantom.

The present invention provides an engine configuration for a utility vehicle 10 such as that illustrated in FIG. 1. Vehicle 10 includes a frame 12, a body 14, wheels 16, and an engine 18. The vehicle is arranged for side-by-side seating with individual bucket seats 20. Alternatively, a bench seat or other seating arrangement may be used. A steering wheel 22 provides a user interface for directing the movement of vehicle 10. A box such as a cargo box 24 is secured behind seats 20 for hauling miscellaneous items for work, chores, or recreation. Vehicle 20 may be two-wheel drive or four-wheel drive and may be designed for recreational or utility use. The engine configuration of the present invention is an advance to off-road vehicles providing increased operator space, reduced noise levels to the operator, cooler engine temperatures, and simplified construction.

Figure 2:
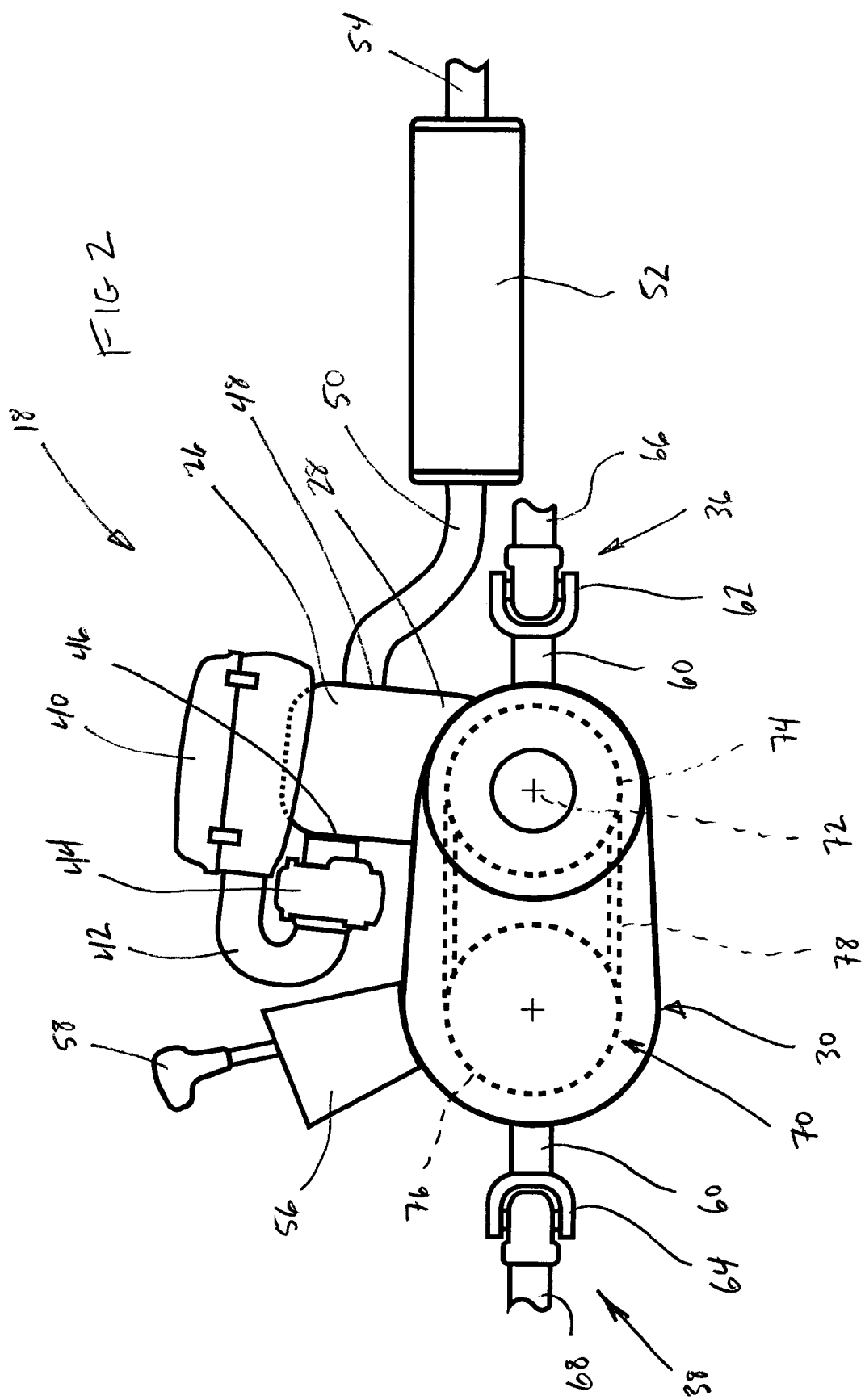
FIG. 2 is a side-elevational view of the left side of the engine.

Both FIGS. 1 and 2 illustrate the basic engine configuration. The left side of engine 18 is seen in FIG. 2, removed from the vehicle frame and body for clarity of illustration. Engine 18 includes a cylinder 26 attached atop a crank case 28. A transmission 30 extends below and forward of cylinder 26. This arrangement contrasts with prior-art systems in which the transmission extends rearwardly of cylinder 26. Having the cylinder at the rearward end of the engine allows more operator room. The operator and a passenger may place their feet on a floor 34 in front of seats 20 and engine 18, as shown in FIG. 1. An engine cover 32 separates the operator from the engine components, which may be disposed between seats 20.

A rear drive line 36 extends rearwardly from engine 18 to drive the rear wheels 16 of vehicle 10. In a preferred embodiment, a front drive line 38 is also provided to drive the front wheels.

Having cylinder 26 at the rearward end of engine 18 also allows for a simplified arrangement of the air-intake and exhaust systems. Thus, an air box/air cleaner 40 is positioned above engine 18 with an intake hose 42 leading to a carburetor 44 attached to an intake port 46 on the forward side of cylinder 26 above transmission 30. The space in front of cylinder 26 and above transmission 30 provides a convenient location for positioning of these components and also allows for cooler air to be fed into cylinder 26 for cooler engine operating temperatures. Note that alternatively, other fuel and air flow mechanisms may be used, such as fuel injection.

Also convenient in this engine arrangement is exhaust port 48 situated on the rearward side of cylinder 26. An exhaust pipe 50 is secured to exhaust port 48 to channel exhaust gases rearwardly of cylinder 26. Exhaust pipe 50 is connected to a muffler 52, which is in turn connected to a tailpipe 54. Thus, the path of hot gases extends directly rearward from cylinder 26. This results in less chance of hot engine components being in the vicinity of the operator or passengers of vehicle 10. Furthermore, the noise produced by the exhaust system is shifted rearwardly such that the levels to the operator and passenger are reduced. Simpler and fewer parts are also required for the exhaust system that does not need to curve around the front of the cylinder before sending exhaust gases to the tailpipe.

A simplified shift mechanism 56 is also secured to the front of the transmission 30. Positioning in this manner allows the shift mechanism to be conveniently located adjacent the seat of the operator of vehicle 10 without additional linkages. The shift mechanism 56 includes a shift lever 58 extending outwardly for operator control. In the preferred embodiment of the present invention, shift mechanism 56 is employed to select between forward (high and low range), neutral, and reverse operation with an automatic transmission system described below.

The engine drive mechanism includes an engine drive shaft 60 driven by transmission 30 and extending fore and aft of transmission 30. Drive shaft 60 includes a rear U-joint 62 and a front U-joint 64 inter-connecting rear and front drive shafts 66 and 68. Drive shafts 66 and 68 extend rearwardly and forwardly, respectively, to forward and rearward drives (not shown) to propel wheels 16. Alternatively, a rearward-drive-only system may be employed or a front-drive-only system may be employed.

The engine preferably includes a continuously variable transmission 70. Other manual or automatic transmissions may alternatively be employed. Continuously variable transmission 70 is secured to a crank shaft 72 of engine 18. A drive pulley 74 is secured to crank shaft 72 with a driven pulley 76 positioned forwardly therefrom. A belt 78 couples the two pulleys, which include spring-loaded sheaves in a conventional arrangement to create a continuously variable transmission. A gear mechanism couples the driven pulley to engine drive shaft 60.

Figure 3:
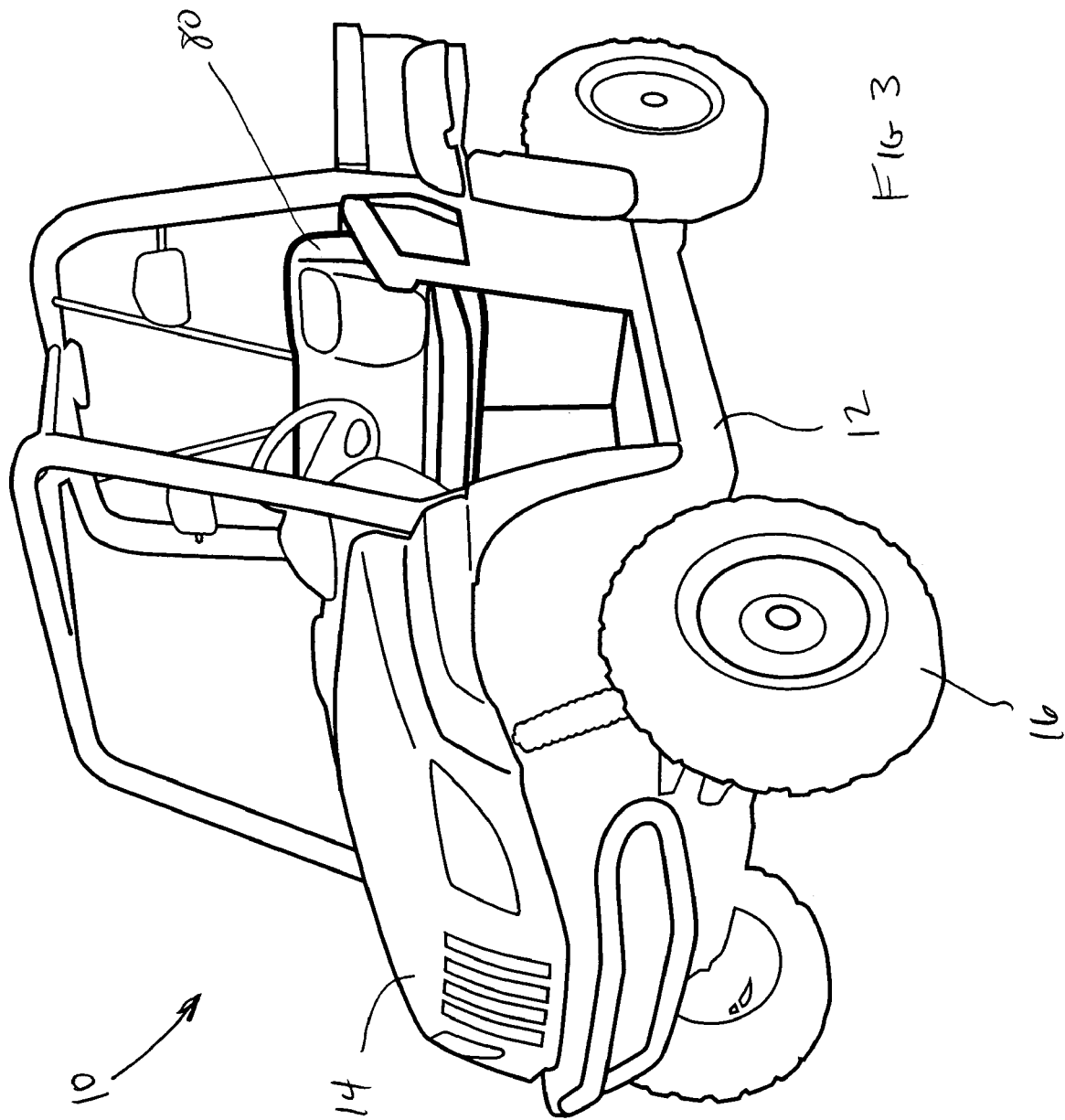
FIG. 3 is a perspective view of a bench seat embodiment of the present invention.
Figure 4:
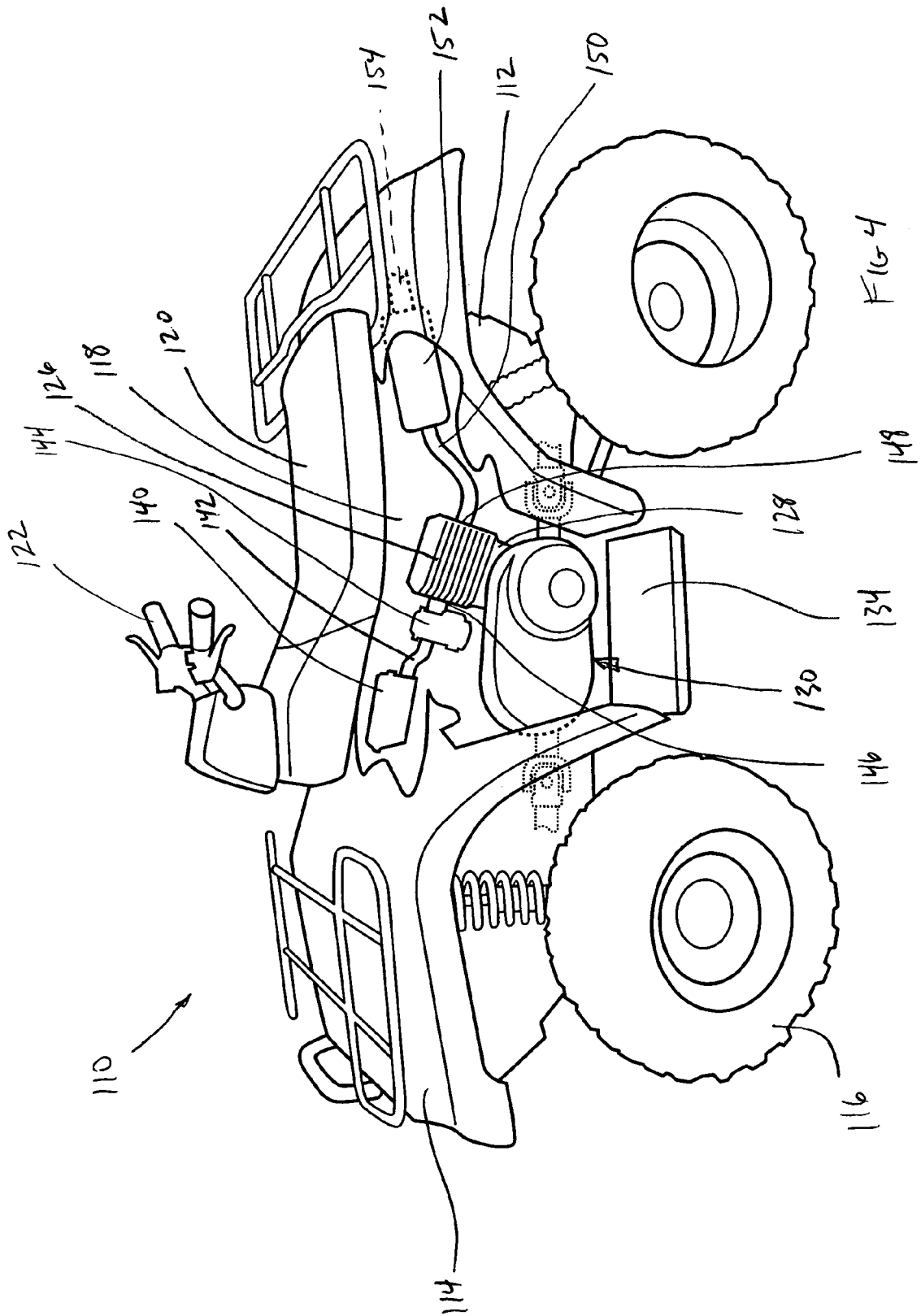
FIG. 4 is a side view of a straddle-mounted embodiment of the present invention.

This basic engine configuration may be used in various embodiments of utility vehicles or ATVs. For example, FIG. 3 illustrates a bench-seat arrangement of a utility vehicle with a side-by-side seating 80. FIG. 4 illustrates an ATV 110 with a straddle-mounted seat arrangement employing the engine configuration of the present invention. Such an ATV may be configured for one or more passengers seated behind the vehicle operator.

More specifically, as illustrated in FIG. 4, ATV 110 includes a frame 112 with a body 114 secured thereto. Wheels 116 are also coupled to the frame through a suspension system. Engine 118 is similar to that described above in connection with FIG. 2 and is situated such that cylinder 126 is positioned at the rearward side of transmission 130. A seat 120, positioned above engine 118 and handlebars 122, allows the operator to control the driving direction of ATV 110.

As with the engine illustrated in FIG. 2, note that a crank case 128 is positioned below cylinder 126 with transmission 130 extending forwardly therefrom. Footwells 134 are positioned on either side of engine 118.

The air box/air cleaner 140 has an intake hose 142 connected to a carburetor 144. Cleaner 140 is positioned forward of cylinder 144, above the forwardly extending portion of transmission 130. The carburetor is connected to an intake port 146 on the forward side of cylinder 126 such that cool air flows into engine 118 for cooler engine operating temperatures than with a conventional arrangement.

Further note that an exhaust port 148 is positioned on the rearward side of cylinder 126 with an exhaust pipe 150 extending to muffler 152, all rearward of cylinder 126. A tailpipe 154 allows gases to be expelled at the rearward end of ATV 110.

The system for ATV 110 works best with an automatic transmission, such as a continuously variable transmission described above. However, a manual or other transmission system may alternatively be used. Extending the exhaust pipe directly rearwardly of cylinder 126 increases rider safety since the hot pipe does not extend pass the rider's leg.

While the preferred embodiments of the invention have been illustrated and described, as noted above, many changes can be made without departing from the spirit and scope of the invention. Accordingly, the scope of the invention is not limited by the disclosure of the preferred embodiments. Instead, the invention should be determined entirely by reference to the claims that follow.

The embodiments of the invention in which an exclusive property or privilege is claimed are defined as follows:

1. A vehicle for traveling over land comprising:
   a. a frame having a forward end and a rearward end, the frame having a major axis, a minor axis, and a plurality of seating locations positioned generally side-by-side, parallel to the minor axis of the vehicle, the seating location having a forward extent and a rearward extent;
   b. an engine secured to the frame, the engine having at least one cylinder and a crankshaft within a crankcase fastened generally beneath the cylinder, wherein the cylinder includes a forward side and a rearward side, the engine positioned forward of the rearward extent of the seating locations;
   c. a continuously variable transmission coupled to the engine crankshaft and extending forwardly from the crankshaft, towards the forward end of the frame;
   d. an air intake in fluid communication with the forward side of the cylinder;
   e. an exhaust port in the rearward side of the cylinder; and
   f. an air box in fluid communication with the forward side of the cylinder and positioned directly above the cylinder.

2. The vehicle of claim 1, wherein the seating locations are provided by a bench secured to the frame, the vehicle providing user foot space generally forward of the engine and transmission.

3. A vehicle for traveling over land comprising:
a. a frame having a forward end and a rearward end, the vehicle having a longitudinal axis extending from the forward end to the rearward end;
b. an engine secured to the frame, the engine having at least one cylinder and a crankshaft within a crankcase fastened generally beneath the cylinder, wherein the cylinder includes a forward side and a rearward side, the engine further comprising an exhaust port through the rearward side of the cylinder and an exhaust pipe extending rearward from the exhaust port;
c. a continuously variable transmission coupled to the engine crankshaft and extending forwardly from the crankshaft, towards the forward end of the frame;
d. a side-by-side seating arrangement secured to the frame generally along an axis substantially perpendicular to the longitudinal axis of the vehicle, the seating arrangement having a left seating position and a right seating position; and
e. an air intake in fluid communication with the forward side of the cylinder, the air intake including an air box positioned at least partially directly above the cylinder between the left and right seating positions.

4. The vehicle of claim 3, wherein the seating arrangement is provided by a bench secured to the frame, the vehicle providing user foot space generally forward of the engine and transmission.

5. The vehicle of claim 3, wherein the seating arrangement includes two forward-facing bucket seats, the engine being positioned forward of the rearward-most extent of the bucket seats, the air box positioned between the bucket seats.

6. The vehicle of claim 5, further comprising a fuel mechanism in fluid communication with the forward side of the cylinder and with the air box, the fuel mechanism being positioned forward of the cylinder.

7. The vehicle of claim 6, wherein the fuel mechanism comprises a carburetor.

* * * * *

UNITED STATES PATENT AND TRADEMARK OFFICE
CERTIFICATE OF CORRECTION

PATENT NO. : 7,438,153 B2
APPLICATION NO. : 11/129069
DATED : October 21, 2008
INVENTOR(S) : Kalsnes et al.

Page 1 of 1

It is certified that error appears in the above-identified patent and that said Letters Patent is hereby corrected as shown below:

In Column 4, Claim 1, Line 47 the word "location" should be "locations"

In Column 6, Claim 7, Line 18 the "." should be deleted

Signed and Sealed this

Sixteenth Day of December, 2008

JON W. DUDAS
*Director of the United States Patent and Trademark Office*